(12) United States Patent
Liu et al.

(10) Patent No.: US 11,976,939 B2
(45) Date of Patent: May 7, 2024

(54) HIGH-DEFINITION MAPS AND LOCALIZATION FOR ROAD VEHICLES

(71) Applicant: NVIDIA CORPORATION, Santa Clara, CA (US)

(72) Inventors: Baoan Liu, Pittsburgh, PA (US); Tian Lan, Pittsburgh, PA (US); Kezhao Chen, Pittsburgh, PA (US)

(73) Assignee: NVIDIA CORPORATION, Santa Clara, CA (US)

( * ) Notice: Subject to any disclaimer, the term of this patent is extended or adjusted under 35 U.S.C. 154(b) by 222 days.

(21) Appl. No.: 17/498,633

(22) Filed: Oct. 11, 2021

(65) Prior Publication Data

US 2022/0214187 A1 Jul. 7, 2022

Related U.S. Application Data

(60) Provisional application No. 63/090,417, filed on Oct. 12, 2020.

(51) Int. Cl.
*G01C 21/00* (2006.01)
*B64C 39/02* (2023.01)
*B64U 101/30* (2023.01)
*G06T 3/40* (2006.01)
*G06T 3/4038* (2024.01)
(Continued)

(52) U.S. Cl.
CPC ........ *G01C 21/3852* (2020.08); *B64C 39/024* (2013.01); *G01C 21/3822* (2020.08); *G01C 21/3867* (2020.08); *G01C 21/3885* (2020.08); *G06T 3/4038* (2013.01); *G06T 7/73* (2017.01); *G06V 10/774* (2022.01); *G06V 20/17* (2022.01); *G06V 20/182* (2022.01); *B64U 2101/30* (2023.01); *B64U 2201/10* (2023.01); *G06T 2207/10028* (2013.01); *G06T 2207/10032* (2013.01); *G06T 2207/20081* (2013.01);
(Continued)

(58) Field of Classification Search
CPC ............ G01C 21/3852; G01C 21/3822; G01C 21/3867; G01C 21/3885; G06T 3/4038
See application file for complete search history.

(56) References Cited

U.S. PATENT DOCUMENTS

2019/0317239 A1* 10/2019 Olsson ............... G01C 21/3852
2020/0098135 A1 3/2020 Ganjineh et al.
(Continued)

FOREIGN PATENT DOCUMENTS

EP 3 647 733 A1 5/2020

OTHER PUBLICATIONS

International Search Report and Written Opinion issued in corresponding application No. PCT/US2021/054476, dated Jan. 26, 2022.

*Primary Examiner* — James M McPherson
*Assistant Examiner* — Clint Pham
(74) *Attorney, Agent, or Firm* — Maschoff Brennan

(57) ABSTRACT

In various examples, operations include obtaining, from a machine learning model, feature classifications that correspond to features of objects depicted in images of a geographical area in which the images are provided to the machine learning model. The operations may also include annotating the images with three-dimensional representations that are based on the obtained feature classifications. Further, the operations may include generating map data corresponding to the geographical area based on the annotated images.

20 Claims, 8 Drawing Sheets

(51) Int. Cl.
  *G06T 7/73* (2017.01)
  *G06V 10/774* (2022.01)
  *G06V 20/10* (2022.01)
  *G06V 20/17* (2022.01)

(52) U.S. Cl.
  CPC ............... *G06T 2207/30244* (2013.01); *G06T 2207/30256* (2013.01)

(56) References Cited

U.S. PATENT DOCUMENTS

| | | |
|---|---|---|
| 2020/0167689 A1 | 5/2020 | Pojman et al. |
| 2020/0195862 A1* | 6/2020 | Briggs ................. H04N 13/257 |
| 2020/0207273 A1* | 7/2020 | Zydek ................... H04N 7/185 |
| 2020/0301015 A1 | 9/2020 | Siddiqui et al. |

\* cited by examiner

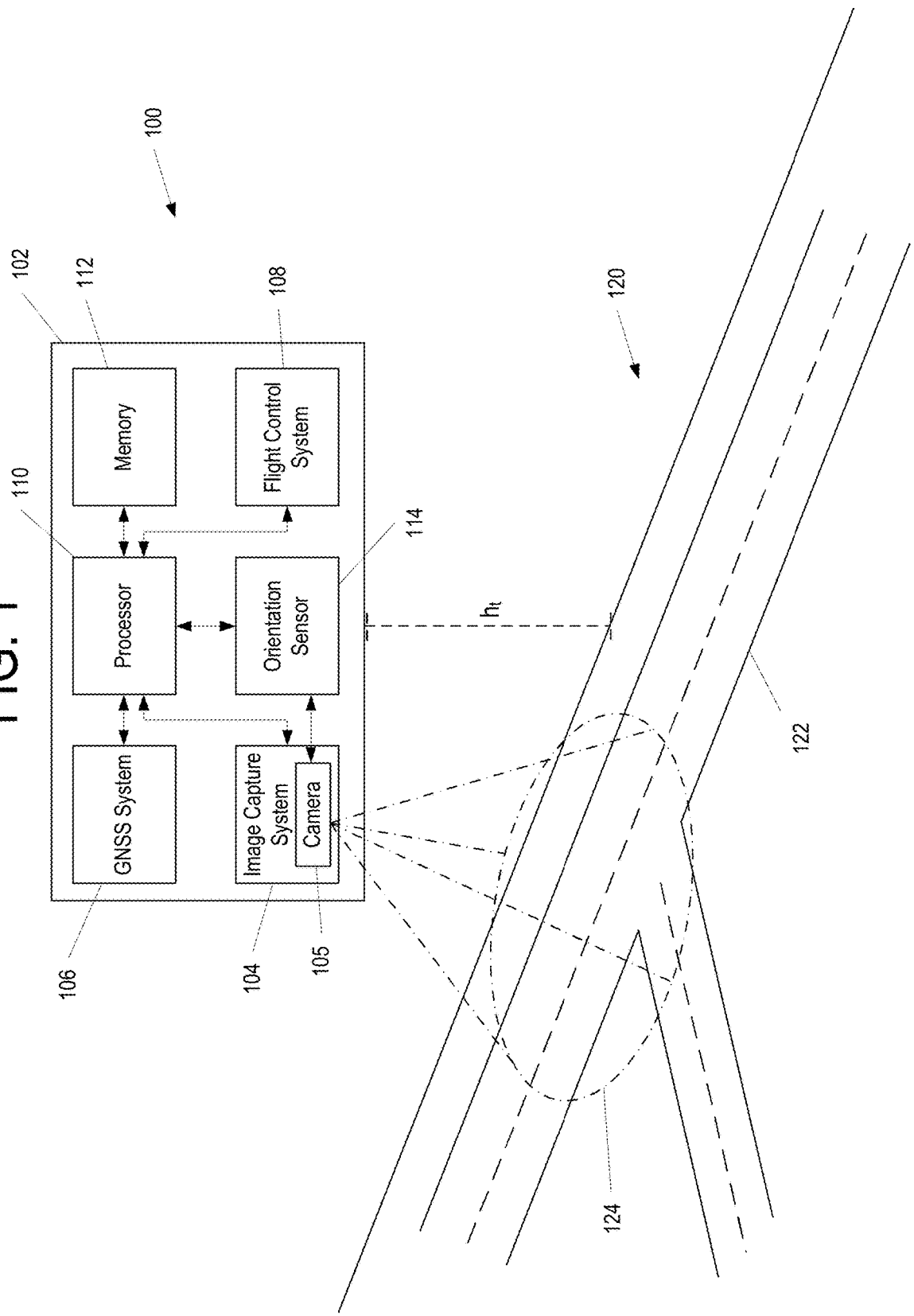

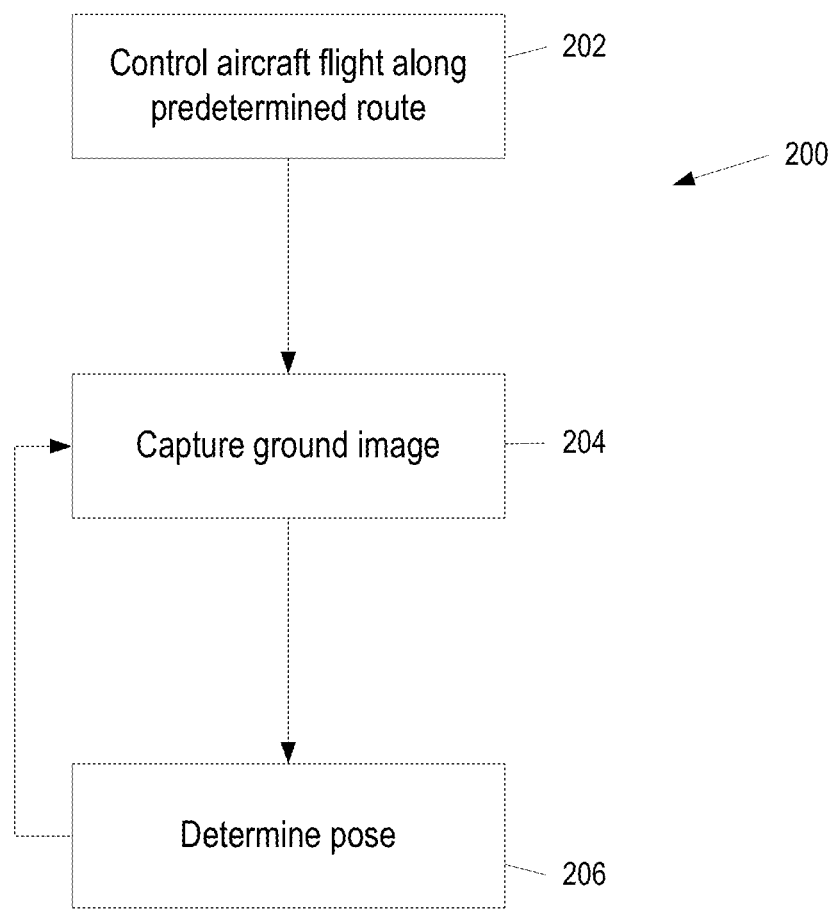

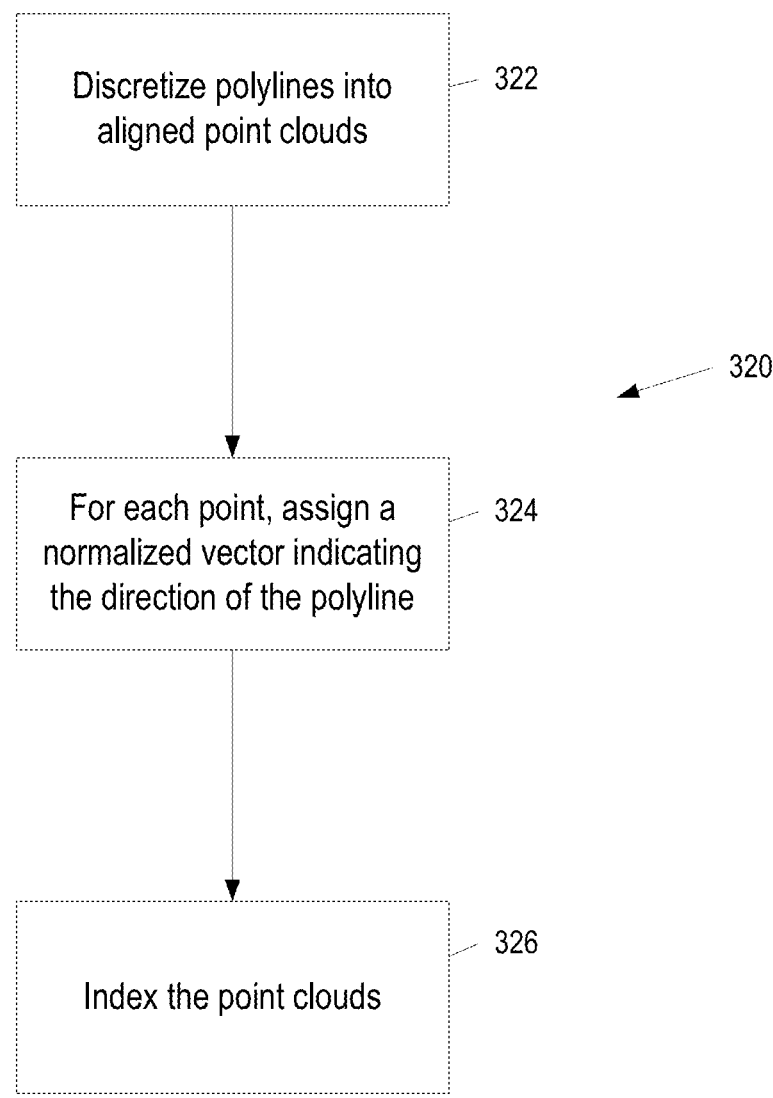

HIGH-DEFINITION MAPS AND LOCALIZATION FOR ROAD VEHICLES

CROSS-REFERENCE TO RELATED APPLICATION

This application claims priority to U.S. Provisional Patent Application No. 63/090,417, filed on Oct. 12, 2020, the disclosure of which is incorporated herein by reference in its entirety.

BACKGROUND

Navigation systems for autonomous road vehicles utilize maps of the streets and roads that the vehicles are navigating for a variety of purposes. For example, autonomous navigation systems utilize pre-generated maps to understand the traffic rules in the environment, monitor and avoid obstacles, verify their location, and so on.

SUMMARY

Embodiments of the present disclosure relate to high-definition maps and localization for road vehicles. Systems and methods are disclosed that relate to generating map data of a geographical area based on images that are annotated with three-dimensional representations of features of objects depicted in the images. .

BRIEF DESCRIPTION OF THE DRAWINGS

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 1 illustrates a diagram of an aerial imaging system, in accordance with at least one aspect of the present disclosure.

FIG. 2 illustrates a flowchart of a process for capturing aerial images and the associated camera poses, in accordance with at least one aspect of the present disclosure.

FIG. 3B illustrates a flowchart of a process for building a HD localization prior map, in accordance with at least one aspect of the present disclosure.

DETAILED DESCRIPTION

Figure 3A:
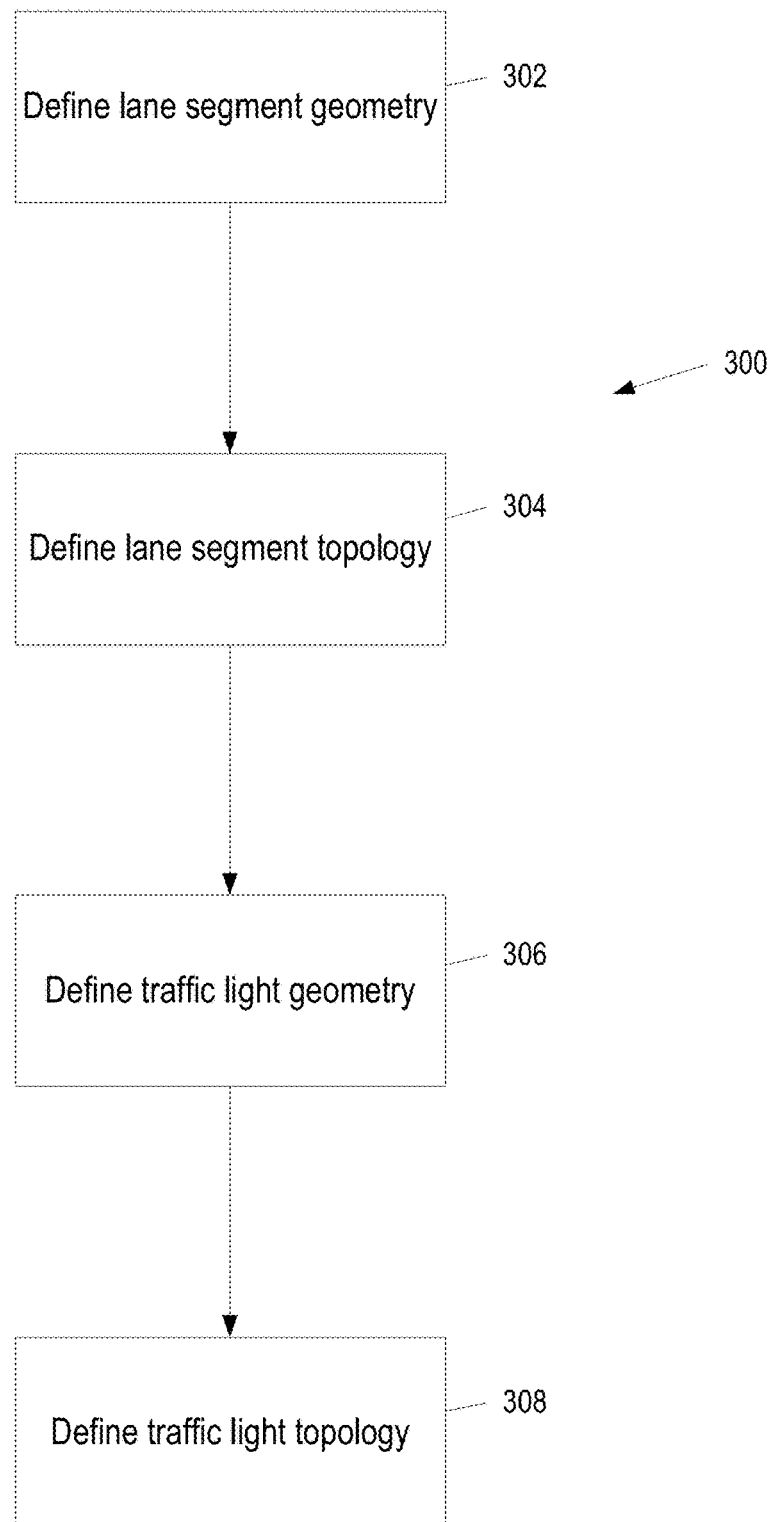
FIG. 3A illustrates a flowchart of a process for building a HD lane graph map, in accordance with at least one aspect of the present disclosure.

The present disclosure is directed, in one general aspect, to systems and methods for generating highly precise maps for autonomous navigation of road vehicles. In the description below, "vehicles" refers to road vehicles, such as cars, trucks, buses, etc. Certain aspects of the autonomous navigation system are now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof. Aerial Image Data Collection HD images of "thoroughfares" (collectively referring to all types of roads and thoroughfares on which road vehicles drive, such as streets, avenues, highways, bypasses, ramps, expressways, etc.) and ground structures (buildings, bridges, trees, etc.) captured aerially are utilized throughout various aspects described herein. FIG. 1 illustrates a diagram of an aerial imaging system 100, in accordance with at least one aspect of the present disclosure. The aerial imaging system 100 can include an aircraft 102, such as an unmanned aerial vehicle (UAV) or fixed-wing aircraft. In one aspect, the aircraft 102 is a DJI Phantom 4 Pro UAV. The aircraft 102 includes an image capture system 104 including a downward-looking high resolution camera 105, which can be mounted to the aircraft 102 so that the thoroughfares and ground structures on the ground are within the field of view of the camera 105. The camera 105 of the image capture system 104 has at least a threshold resolution so that the aerial imaging system 100 is able to obtain images of the thoroughfares and ground structures with the required resolution for navigating the vehicles autonomously on the thoroughfares. In one aspect, the threshold resolution is 3 cm/pixel. The aircraft 102 further includes a Global Navigation Satellite System (GNSS) system 106 that is configured to precisely and continuously determine the location of the aircraft 102 via a GNSS (e.g., GPS), a flight control system 108 that is configured to control the flight of the aircraft 102 (i.e., altitude, attitude, route, and so on), a memory 112, and a processor 110 coupled to each of the aforementioned systems or components. The flight control system 108 includes flight control or autopilot software that is programmable to automatically control the flight of the aircraft 102 (e.g., Pix4Dcapture).

The aerial imaging system 100 is operable to obtain HD images of the thoroughfares and structures on the ground that can be utilized to generate HD maps for use by autonomous vehicles and other systems requiring highly precise maps for various applications, such as navigation. The aerial imaging system 100 obtains the HD images via a process, such as the process 200 depicted in FIG. 2. In the following description of FIG. 2, reference should also be made to FIG. 1. The process 200 can be embodied as instructions stored in the memory 112 that are executed by the processor 110 of the aerial imaging system 100, for example. At a first step 202 of the process 200, the aerial imaging system 100 controls the flight of the aircraft to direct the aircraft along a predetermined or preprogrammed route via, for example, the flight control system 108. In operation, the operators of the aerial imaging system 100 can program the aircraft 102 to fly along a preprogrammed route to map a particular region 120 to ascertain the location and characteristics of any thoroughfares 122, buildings, or any other objects located thereon. In one aspect, the flight control system 108 can be programmed to cause the aircraft 102 to fly over the target region 120 at a height that is greater than or equal to a minimum or threshold height (e.g., 100 m).

At a second step 204, the aerial imaging system 100 captures a HD image of an area 124 via the camera 105. For each image captured, the aerial imaging system 100, at a third step 206, determines the pose associated with the captured images. In computer-vision applications, "pose" can refer to the position and orientation of the camera 105. The aerial imaging system 100 can determine the position of the camera 105 by retrieving the GNSS coordinates via the GNSS system 106 corresponding to the position of the aircraft 102 at the time that the image is captured. The GNSS system can utilize, for example, real-time kinematic (RTK) techniques to precisely track the location of the aircraft 102. The aerial imaging system 100 can determine the orientation of the camera 105 via an orientation sensor 114 coupled to the camera 105. The orientation sensor 114 can include an inertial navigation system (INS), which comprise accelerometers, gyroscopes (e.g., a three-axis gyroscope) and magnetometers, for example. Further, the process 200 repeats the steps 204, 206 of capturing images and the corresponding pose for any number of iterations during the course of the flight of the aircraft 102. The captured aerial images can be organized or arranged to reconstruct the target region 120 over which the aircraft 102 flew according to the camera pose associated with each of the captured images. The arranged images can be utilized to generate maps, especially HD maps, of roads and other thoroughfares.

High-Definition Maps

The HD images captured by the process 200 described above under the heading AERIAL IMAGE DATA COLLECTION can be utilized in a number of different applications. In one application, the aerial images are utilized to construct a HD map of roads and corresponding ground structures located in and around the roads for use in navigation, such as by autonomous vehicles. In particular, the aerial images can be utilized to generate, for example, lane graph maps, which indicate the drivable regions and associated traffic rules of a thoroughfare for an autonomous vehicle's navigation system, and localization prior maps, which are utilized by autonomous vehicles to precisely determine their position within an environment through which the vehicle is navigating. Various processes (or steps thereof) executed by a computer system for generating these HD maps are described below.

In one aspect, a set of images of a target region to be mapped (such as the aerial images captured via the process 200) can be aligned and synthetically stitched together according to the pose associated with each image to form a coherent or continuous image of the region. In one aspect, the aerial images are aligned such that the epipolar geometric relations hold between all of the images in the image set. Accordingly, the positions of thoroughfares and other mapped objects are precisely determinable to within a particular threshold (e.g., 10 cm or less), which allows for precise maps to be developed therefrom.

In various aspects, HD maps for navigational purposes can be constructed from the aligned and stitched image set by annotating the image set with features that are necessary for navigation. In various aspects, the annotations can be applied manually, using machine learning techniques, or combinations thereof. Different types of annotations can be specified for various visible or nonvisible features from the aerial images, including lane markers, curbs, traffic light positions, road surface manifolds, and traffic rules, for example. The annotations can include three-dimensional points, polylines, and polygons with associated semantic labels for the given features being annotated. For example, boundaries between lane markers (e.g., white or yellow painted markers) and the road surface can be represented by a three-dimensional polygon, where the dimensions of lane markers correspond to the dimensions of the applied polygon. As another example, the boundaries of curbs can be represented by three-dimensional polylines, where the length(s) of the line segment(s) of the polyline can correspond to the contours of the curbs. As yet another example, a pole (e.g., a light pole or a pole of a billboard frame) can be represented as a three-dimensional polyline, where the length(s) of the line segment(s) of the polyline can correspond to the height of the pole (or a portion thereof). Furthermore, epipolar geometric techniques can be utilized to calculate GPS coordinates for each of the annotations. The calculated GPS coordinates can then be associated with each of the annotations. The annotations, GPS coordinates, and semantic labels can then be encoded into an appropriate file format for further processing.

In one aspect, the aligned images can be provided to human users to be manually annotated. The users can make the annotations on the images utilizing an annotation software platform based on a specified annotation instruction and rule set. The annotation software platform can allow users to specify the type of feature being annotated and then automatically select the appropriate annotation type and then calculate the associated GPS coordinates of the completed annotation after it is applied to the image(s).

In one aspect, the aligned images can be processed by a machine learning model, such as a convolutional neural network, that generates the annotations for the various features. In one such aspect, the machine learning model can be initially trained on the human-annotated images utilizing supervised learning techniques. The training data can be provided to the machine learning model in a number of different formats. In one aspect, the manually generated annotation data is converted to multidimensional matrices, which can then be processed by the machine learning model. In one such process, the annotations can be reprojected onto the camera plane of the aerial image using the camera pose associated with each of the captured images, creating a two-dimensional projection of the three-dimensional annotations. Further, the two-dimensional projections can be transformed to two-dimensional matrices having the same size of each associated image (e.g., matrices having dimensions equal to the dimensions in pixels of the associated images), where each entry in the matrices indicates whether an annotation is present at that particular location. For example, the matrices can be binary matrices where the presence or absence of a projected annotation at a particular location can be recorded with a non-zero integer or zero, respectively, at the matrix address corresponding to the particular location. The images and the associated matrices can then be partitioned into corresponding equally sized tiles, which can then be encoded (e.g., in a binary format) and fed to the machine learning model for training. The machine learning model can be trained by, for example, a gradient descent optimization algorithm to adjust the weights of neurons of the machine learning model by calculating the gradient of a loss function. Once fully trained, the machine learning model can then be utilized to classify features in received images that the machine learning model has been trained to recognize and apply annotations for those features.

In operation, the machine learning model described above (or a similar machine learning model) can be trained to receive the aligned images (or partitioned portions thereof) and then output two-dimensional feature matrices. The two-dimensional feature matrices can then be fed into a polyline/polygon feature-fitting algorithm that outputs three-dimensional representations (i.e., points, polylines, and polygons) of the features and their associated GPS coordinates. The feature-fitting algorithm can utilize, for example, heuristic optimization techniques and the epipolar geometrical relations from the image alignment process to generate the output.

The annotation data, whether supplied by manual or machine learning techniques, can then be utilized to generate a variety of maps, including maps that are useful for autonomous navigation purposes, such as lane graph maps and localization prior maps. For example, FIG. 3A illustrates a flowchart of a process 300 for building a HD lane graph map and FIG. 3B illustrates a flowchart of a process 320 for building a HD localization prior map, in accordance with various aspects of the present disclosure. The processes of FIG. 3A and 3B can be performed by an appropriately programmed computer system, such as described below.

Referring now to FIG. 3A, the illustrated computer-implemented process 300 can create lane graph maps, which can be utilized for autonomous vehicles' motion planning or navigation systems. A lane graph map is encoded data that contains traffic lane segments and traffic lights. The lane segments include polygons that delineate the traffic lanes along which vehicles are intended to drive. The traffic segments can include a variety of data, including geometries of left and right lane boundaries in the map's coordinate system, colors of painted lines or lane makers to which the lane segment corresponds, traffic direction points (i.e., a point at the entrance associated with each lane segment that indicates the corresponding traffic direction), identifications of (i.e., connectivity lines to) the predecessor and successor lane segments (which can be utilized to infer traffic rules), identifications of (i.e., connectivity lines to) the adjacent neighbor lane segments (which can be utilized to infer the traffic rules), the associated speed limit, and/or the lane segment type (e.g., bidirectional, unidirectional, or bike lane). The traffic lights can include a variety of data, including the three-dimensional coordinates of the traffic lights (including, in some aspects, the coordinates of each individual bulb of the traffic light) and identifications of the lane segments associated with the traffic lights. Accordingly, the process 300 can import some or all of this data in constructing the lane graph maps.

At a first step 302, the computer system receives the aforementioned annotation data and defines the geometry of the lane segments from the lane segment boundary polylines, cut lines, and traffic direction points. At a second step 304, the computer system defines the topology of the lane segments by assigning relations between the lane segment geometries (defined at the first step 302) and the predecessor, successor, and adjacent line segments. Further, the computer system can assign the speed limit metadata to the lane segment topology.

At a third step 306, the computer system defines the geometry of the traffic lights based on the three-dimensional coordinates of the traffic lights. At a fourth step 308, the computer system defines the topology of the traffic lights by assigning the associated lane segments that are controlled by each particular traffic light based on the traffic light association data.

Figure 4:
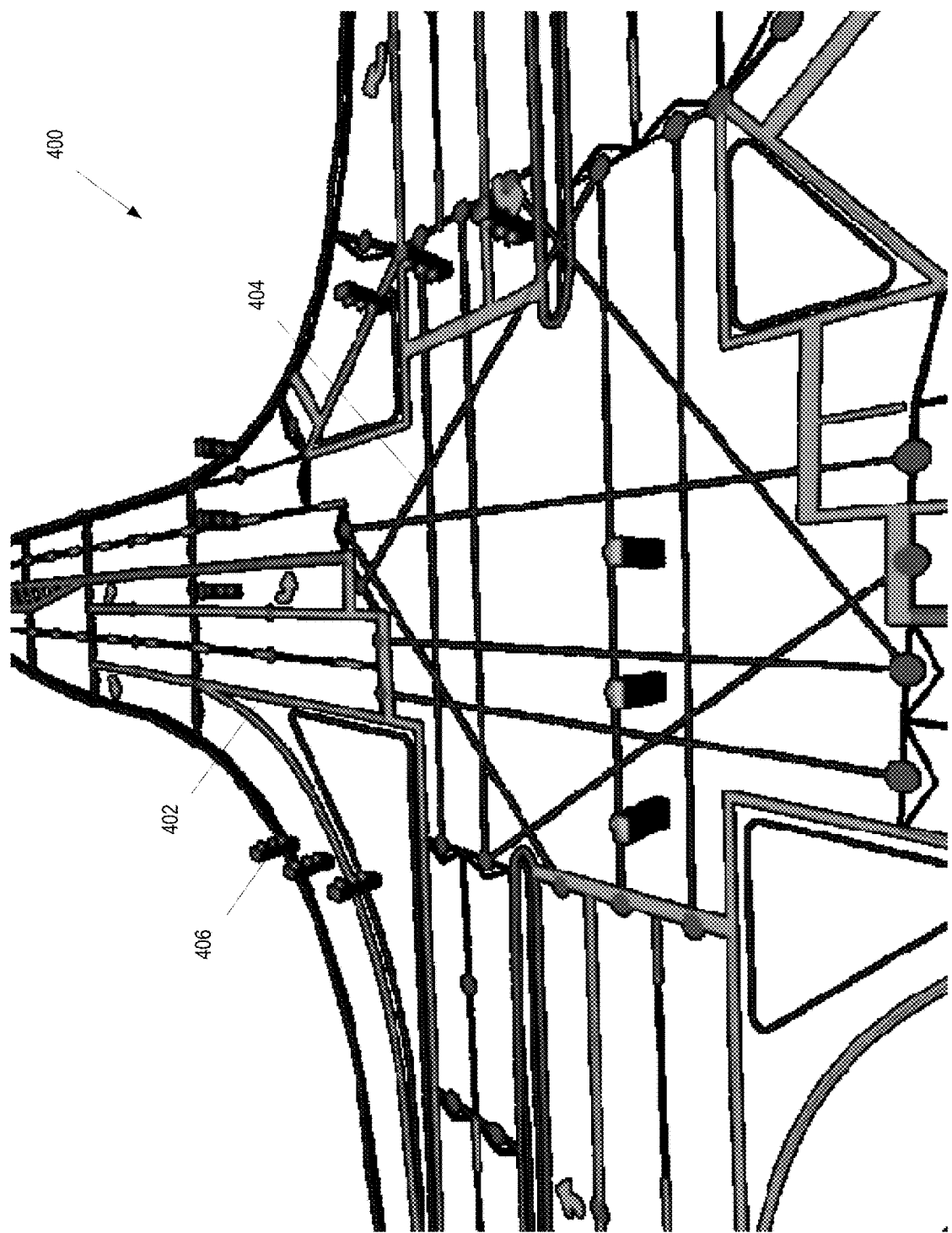
FIG. 4 illustrates a lane graph map, in accordance with at least one aspect of the present disclosure.

In sum, the process 300 described above can output lane graph maps, such as the representation of the lane graph map 400 illustrated in FIG. 4. As shown in FIG. 4, the lane graph map 400 can include lane segments 402 (which can further be colored or otherwise differentiated to indicate traffic direction), connectivity lines 404 connecting various lanes defined by the lane segments 402, traffic lights 406, and so on. In some aspects, because the lane graph map 400 generated by the process 300 illustrated in FIG. 3A is developed from high-resolution aerial images, the lane boundaries, topological arrangement of the lanes, curb boundaries, positions of traffic lights, and the defined drivable regions of the resulting lane graph map 400 are in turn highly precise. Further, the lane graph map generated by the process 300 illustrated in FIG. 3A can then be encoded in a particular data format (e.g., k-d tree) and uploaded into an autonomous vehicle's computer system for use by the autonomous vehicle's systems during navigation through an environment.

Referring now to FIG. 3B, the illustrated computer-implemented process 320 can create prior maps, which can be utilized for autonomous vehicles' localization systems. A localization prior map is encoded data that contains the three-dimensional boundaries of lane markers (e.g., painted lane markers and raised pavement markers), edges of curbs, edges of vertical objects or structure (e.g., poles), traffic directions, road surface manifolds, and/or other data required by autonomous vehicles' localization algorithms. Various techniques for using such prior maps for autonomous vehicle localization are described in further detail below under the heading LOCALIZATION.

At a first step 322, the computer system receives the aforementioned annotation data and discretizes the polylines (e.g., the polylines delineating the lane markers, curbs, vertical features, and so on) into aligned point clouds. In one aspect, the computer system discretizes the polylines such that the separation between adjacent points is no larger than a particular threshold (e.g., 10 cm).

At a second step 324, the computer system assigns a normalized vector to each of the points, where the normalized vector represents the direction of the polyline from which the point was discretized. At a third step 326, the computer system indexes the point clouds via an indexing algorithm. In various aspects, the indexing algorithm can include a two-dimensional Morton code algorithm (i.e., an algorithm that converts two-dimensional coordinates to Morton code) and a three-dimensional k-d tree algorithm. The encoding system for the prior map is designed for computational efficiency, allowing the prior map to be utilized while an autonomous vehicle is in the process of navigating through the environment corresponding to the prior map.

In sum, the process 320 described above can output localization prior maps as indexed sets of point clouds. In some aspects, because the localization prior map generated by the process 320 illustrated in FIG. 3B is developed from high-resolution aerial images, the features encoded by the prior map are in turn highly precise. In one aspect, the GPS coordinate of any arbitrary point within the prior map can be accurate to a particular threshold (e.g., 10 cm). Further, the encoded localization prior map generated by the process 320 illustrated in FIG. 3B can be uploaded into an autonomous vehicle's computer system for use by the autonomous vehicle's systems during navigation through an environment.

Each of the aforementioned systems or process described above in connection with FIGS. 3A and 3B can represent a software application, module, and/or algorithm that can be embodied as compiled computer instructions that are executable by a computer, such as an off-line computer, e.g., not the computer system of an autonomous vehicle, but as described above, the outputs of the processes of FIGS. 3A-B can be used by the computer systems of autonomous vehicles for navigation purposes. In particular, the steps illustrated in FIGS. 3A and 3B can be embodied as instructions stored in a memory that, when executed by a processor, cause the computer system to perform the delineated steps. Although described generally in terms of software, in other aspects, the aforementioned applications, modules, and/or algorithms can be implemented in hardware (e.g., application-specific integrated circuits and field-programmable gate arrays) or combinations of hardware and software. Localization The HD maps generated by the aforementioned process 300, 320 illustrated in FIGS. 3A and 3B can be utilized in a number of different applications. In one application, the maps are utilized by autonomous vehicles (e.g., self-driving cars) for navigating. In particular, the process 320 illustrated in FIG. 3B can be utilized to generate prior maps for autonomous vehicles. Many autonomous vehicles require prior maps in order to effectively navigate through an environment. Prior maps are maps of an environment that have been previously constructed off-line (or not in real-time) and are annotated with various details of the environment, including lane information, traffic sign information, road geometry, and so on. When in operation, autonomous vehicles can compare what they are presently "seeing" via their cameras or other sensors to the prior map in order to confirm their present location (or even ascertain their present location when their location-detection system, such as a GNSS system, is inactive or inoperable), assist in distinguishing between static and moving (or movable) objects (e.g., cars) for obstacle detection and avoidance, reduce real-time processing requirements by reducing the number of objects that the autonomous vehicles' systems has to actively track, allow the vehicle to locally orient itself with respect to the environment, and so on. Accordingly, the HD prior maps generated by the aforementioned process 320 are an improvement over previous non-HD prior maps because they allow autonomous vehicles to navigate more precisely within the environment.

Figure 5:
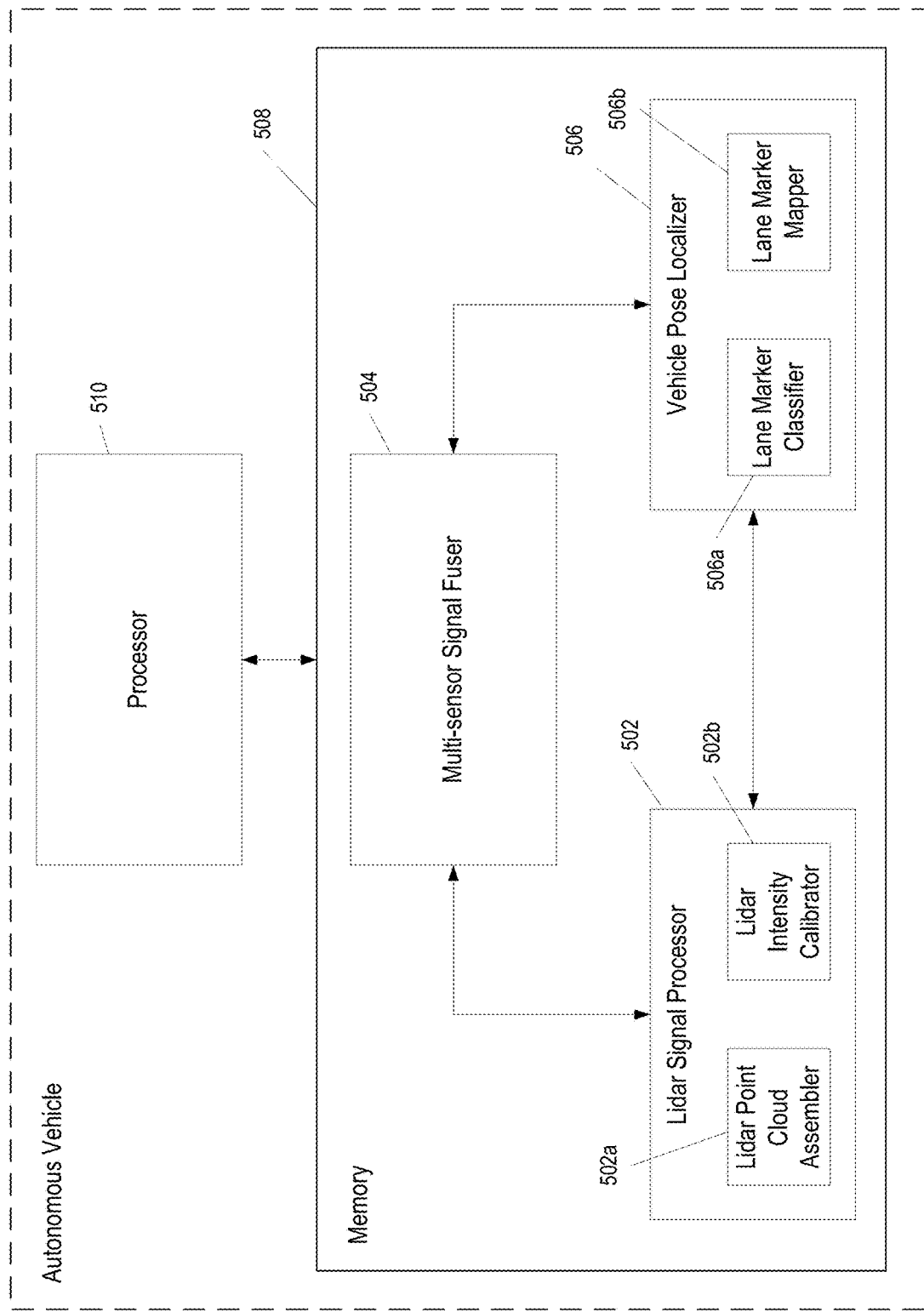
FIG. 5 illustrates a block diagram of a localization system for an autonomous vehicle, in accordance with at least one aspect of the present disclosure.

In various aspects, an autonomous vehicle can include a lidar sensor and various other sensor modalities for "seeing" the surrounding environment. A lidar sensor utilizes pulse laser light to measure distances between the lidar sensor and objects in the environment, as is known in the art. In one aspect, a localization system (e.g., a software application) running on an autonomous vehicle can utilize the HD prior maps described above. The localization system can be configured to receive the real-time signal input from the on-vehicle sensors (e.g., lidar, inertial measurement unit [IMU], GNSS, speedometer, and cameras) and then output an estimation of the autonomous vehicle's current position and attitude (i.e., translational and rotational movement, which can include six degrees of movement in total) with respect to the HD prior map and the relative vehicle reference frame (e.g., linear/angular velocity, linear/angular acceleration, and other sensor correction information). As depicted in FIG. 5, the localization system 500 includes three interrelated components: a lidar signal processor 502, a multi-sensor signal fuser 504, and the vehicle pose localizer 506. Each of these components is discussed below.

In one aspect, the lidar signal processor 502 can include a lidar point cloud assembler 502a that is programmed to assemble, in real-time as the vehicle is driving around, a three-dimensional representation of the surrounding environment of the vehicle from the sensor data generated by the vehicle's lidar sensor. The lidar signal processor 502 can assemble the environmental representation by receiving the time-stamped coordinates of the lidar point cloud generated by the lidar sensor, which is in the lidar's frame of reference, and receiving the current vehicle pose output from the multi-sensor signal fuser 504. The lidar signal processor 502 can then transform the lidar point cloud coordinates to the coordinates of the global reference frame. For example, the lidar signal processor 502 can execute an algorithm that caches the vehicle's pose received from the multi-sensor signal fuser 504, transforms the coordinates of each lidar point within the generated point cloud to a global coordinate frame (e.g., by retrieving the cached vehicle pose corresponding to the timestamp of the particular lidar point), and then outputs the transformed point cloud. This transformed point cloud can then be utilized to, for example, determine whether a given lidar point corresponds to a particular structure or object defined by the localization prior map, one implementation of which is discussed below.

Figure 6:
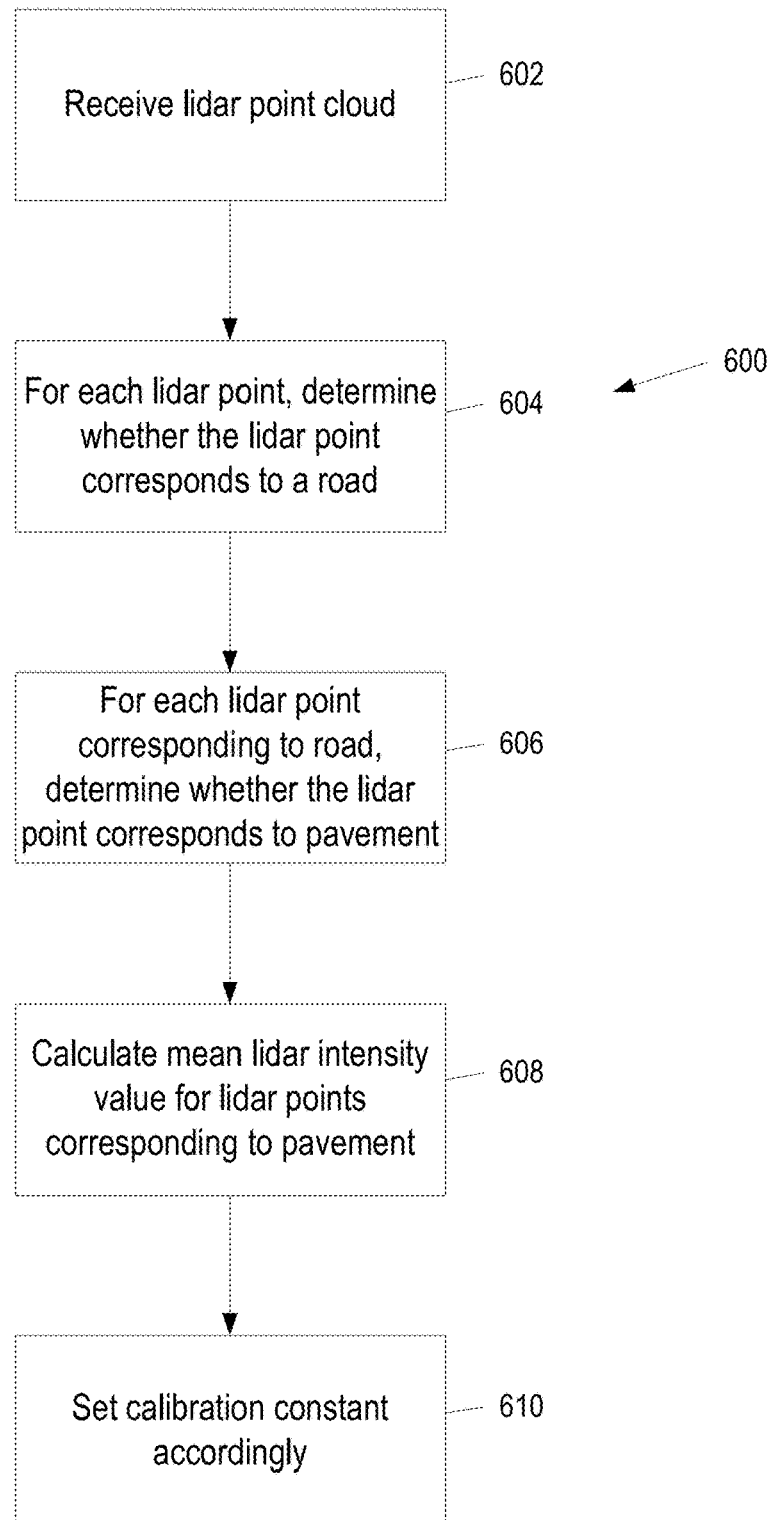
FIG. 6 illustrates a flowchart of a process for calculating a lidar intensity calibration constant, in accordance with at least one aspect of the present disclosure.

In another aspect, the lidar signal processor 502 can include a lidar intensity calibrator 502b that is programmed to measure the infrared optical reflectivity of the surrounding environment based upon the intensity of the received lidar signal data and calibrate the received raw lidar signal accordingly by, for example, the process 600 illustrated in FIG. 6. At a first step 602, the lidar signal processor 502 receives the lidar point cloud data, such as the transformed lidar point cloud in the global coordinate frame, as discussed above. At a second step 604, the lidar signal processor 502 determines whether each given lidar point within the lidar point cloud corresponds to a road surface. In one aspect, the lidar signal processor 502 makes this determination by querying a localization prior map, such as the HD localization prior map described above, with the coordinates of the particular lidar point and the vehicle pose (e.g., determined via the multi-sensor signal fuser 504, described below) to calculate the coordinates of the particular lidar point relative to the localization prior map reference frame and then determine whether the lidar point corresponds to a road surface, as defined by the localization prior map. At a third step 606, the lidar signal processor 502 determines whether the road lidar points (determined at the second step 604) corresponds to pavement or reflective material (e.g., reflective lane marker paint and reflective raised pavement markers). It can be desirable for the process 600 to remove or otherwise discount any lidar points from reflective materials because such lidar points can incorrectly influence or weight the mean lidar intensity value. In one aspect, the lidar signal processor 502 makes this determination by processing each road lidar point through a binary machine learning classifier that has been trained to distinguish between lidar points corresponding to pavement and reflective material. At a fourth step 608, the lidar signal processor 502 calculates the mean lidar intensity value of the pavement lidar points (determined at the third step 606). At a fifth step 610, the lidar signal processor 502 sets the calibration constant applied to the received raw lidar signal data. The calibration constant can be, for example, the inverse of the calculated mean pavement lidar point intensity value.

Once the calibration constant is set, the lidar signal processor 502 can apply the calibration constant to the raw lidar signal data (e.g., multiply received lidar intensity values by the calibration constant) to compensate for environmental differences and other effects, ensuring any algorithms utilizing the raw lidar signal data are doing so consistently. In some aspects, the lidar signal processor 502 can be executed by the onboard computer of the autonomous vehicle and can continually monitor and update the applied calibration constant in real-time as the vehicle navigates through an environment.

The multi-sensor signal fuser 504 is programmed to compute the pose, velocity, and/or acceleration of the vehicle based on multiple sensor modalities. For example, the sensor modalities can include a GNSS system and/or IMU for determining the absolute or relative position of the vehicle, a speedometer for detecting the speed of the vehicle, and a camera for determining for determining information associated with the environment through which the vehicle is navigating. The sensor modalities can be integral to the autonomous vehicle or mounted thereon. The output of the multi-sensor signal fuser 504 can, for example, be fed to the lidar signal processor 502 and/or vehicle pose localizer 506.

In one aspect, the multi-sensor signal fuser 504 can include a Kalman filter algorithm for updating the state of the vehicle according to the data sensed by the sensor modalities. A Kalman filter is an algorithm that produces estimates of the current state variables, along with their uncertainties, and updates these estimates using a weighted average as new measurements are received, with more weight being given to estimates with higher certainty. The algorithm is recursive and can run in real time, using only the present input measurements and the previously calculated state and its uncertainty matrix; no additional past information is required. For example, the Kalman filter algorithm implemented in some aspects of the multi-sensor signal fuser 504 can receive measurements from the sensor modalities as input and accordingly output estimated state(s) of the vehicle, such as the vehicle pose within the localization prior map and/or global reference frames, the linear and/or angular vehicle velocity, the linear and/or angular vehicle acceleration, and combinations thereof. Accordingly, the multi-sensor signal fuser 504 can receive sensor data and determine the state of the vehicle, which can then be supplied to or utilized by other systems of the vehicle.

The vehicle pose localizer 506 computes the vehicle pose within the prior map coordinate system based upon the calibrated lidar sensor data (e.g., the output from the lidar signal processor 502) and the states of the vehicle (e.g., the output from the multi-sensor signal fuser 504). In particular, the vehicle pose localizer 506 can determine the position of the vehicle within the prior map reference frame by detecting the presence of lane markers and mapping the detected position of the lane markers to the pre-generated localization prior map.

In one aspect, the vehicle pose localizer 506 includes a lane marker classifier 506a that is programmed to receive the lidar point cloud transformed to the transformed coordinate system from the lidar point assembler 502a and the calibrated lidar intensity values from the lidar intensity calibrator 502b. Further, the lane marker classifier 506a is programmed to detect the portions of the lidar point cloud that lie on the boundaries between the lane marker indicators (e.g., paint or raised pavement markers) and the road surface (e.g., asphalt) according to the calibrated lidar intensity values and the geometries of the point cloud. In one aspect, the lane marker classifier 506a can include a machine learning classifier trained to determine the presence of lane marker indicators given the lidar intensities and geometries. Accordingly, the lidar point assembler 502a can output either or both of the point cloud lying on the boundaries of the lane indicators and the point cloud lying on the lane indicators.

Figure 7:
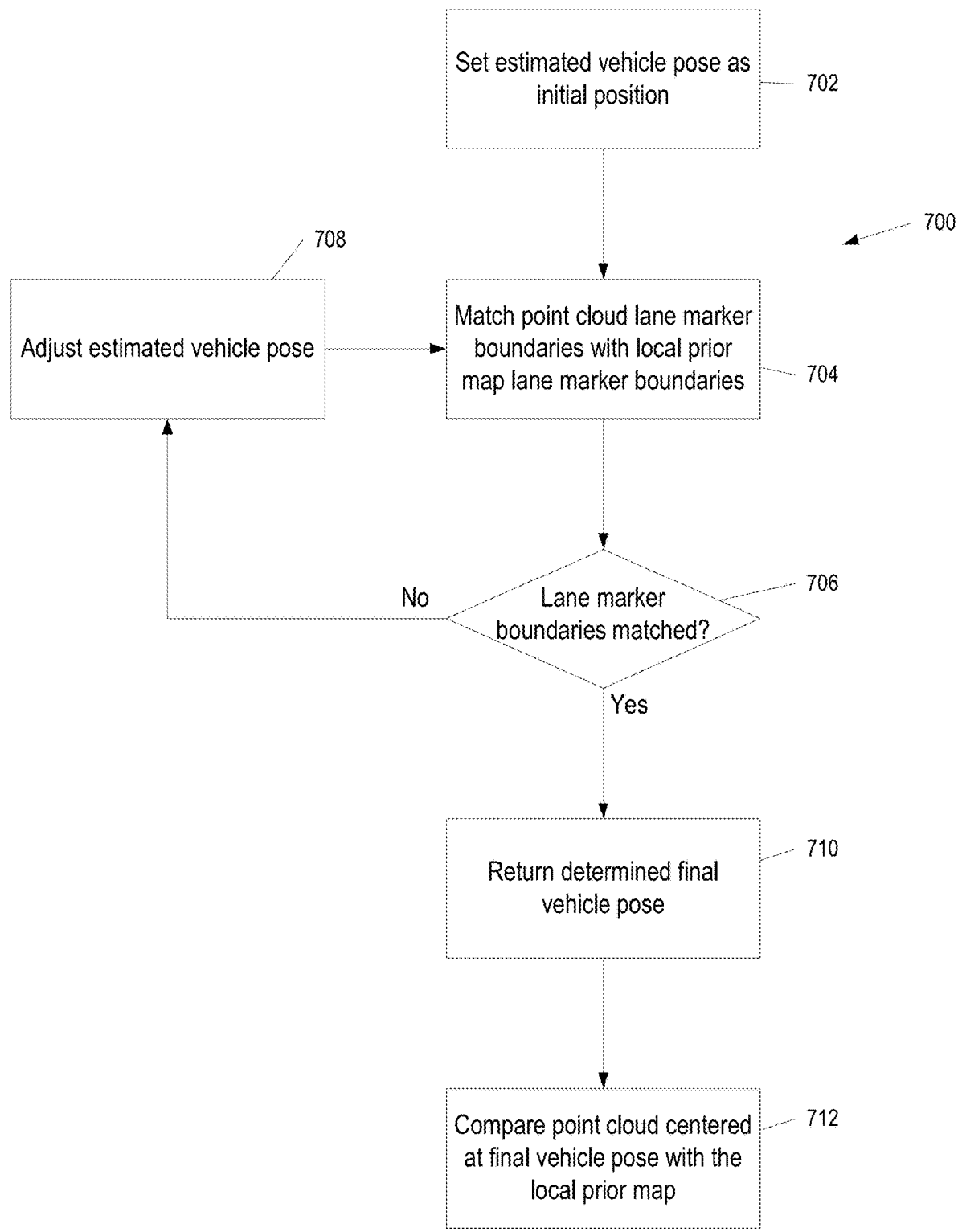
FIG. 7 illustrates a flowchart of a process for computing the position of a vehicle, in accordance with at least one aspect of the present disclosure.

In one aspect, the vehicle pose localizer 506 includes a lane marker mapper 506b that is programmed to receive the lane marker boundaries (e.g., from the lane marker classifier 506a), the localization prior map (e.g., generated by the process 320 described above in connection with FIG. 3B), and the present vehicle pose (e.g., the multi-sensor signal fuser 504). Based on these inputs, the lane marker mapper 506b computes the position of the vehicle with respect to the localization prior map by matching the detected positions of the lane marker boundaries with the annotated position of the lane marker boundaries in the localization prior map. The lane marker mapper 506b can make this computation utilizing the process 700 illustrated in FIG. 7, for example.

At a first step 702, the lane marker mapper 506b retrieves the localization prior map (e.g., from a memory) and sets the initial pose of the vehicle within the localization prior map to an initial or estimated pose, which can include the pose received from the multi-sensor signal fuser 504. At a second step 704, the lane marker mapper 506b matches the point cloud lane marker boundaries, which can be retrieved from the lane marker classifier 506a, to the annotated lane marker boundaries within the retrieved localization prior map. The lane marker boundaries determined from the lidar point cloud can be matched to the annotated lane marker boundaries within the localization prior map in a variety of ways. In one aspect, the lane marker mapper 506b associate each point in lane marker point cloud to the closest lane marker boundary in the localization prior map and calculates an overall cost function and the Jacobian matrix of the cost with respect to the six degrees of freedom of transformation (i.e., translational and rotational movement) between the compared boundaries. Further, the lane marker mapper 506b then adjusts the current pose of the vehicle within the localization prior map based on the Jacobian of the cost to a new pose that has a smaller overall cost. The cost function can include, for example, a function that produces a penalty according to the Euclidean distance between a lane marker boundary in the lidar point cloud and the nearest lane marker boundary within the localization prior map.

At a third step 706, the lane marker mapper 506b determines whether the lane marker boundaries from the detected lidar point cloud and the localization prior map are matched to each other, within a tolerance. In one aspect, the localization prior map and point cloud lane marker boundaries can be considered to be matched when the cost function is at a local minimum. If the lane marker mapper 506b determines that the lane marker boundaries are not matched, then the process 700 proceeds to a fourth step 708 and the lane marker mapper 506b continues adjusting the estimated vehicle pose, as described above, until the lane marker boundaries are matched (and thus the vehicle pose is precisely determined). If the lane marker mapper 506b determines that the lane marker boundaries are matched, then the process 700 proceeds to a fifth step 710 and the lane marker mapper 506b returns the determined final pose of the vehicle. Accordingly, the process 700 executed by the lane marker mapper 506b takes the initial estimate of the pose of the vehicle from the multi-sensor signal fuser 504 and then precisely pinpoints the actual pose of the vehicle within the localization prior map by fitting the detected lane marker boundaries to the lane marker boundaries within the localization prior map. The more precise the localization prior map is, the most precisely the autonomous vehicle may be able to determine its actual, real-world position. Accordingly, building the localization prior map from a set of HD images of the environment can ultimately create substantial benefits for autonomous vehicles' navigation systems. In one aspect, the determined vehicle pose with respect to the localization prior map reference frame can be, for example, fed back to the multi-sensor signal fuser 504 to assist the multi-sensor signal fuser 504 in further ascertaining the pose of the vehicle (e.g., via updating the state of the vehicle in a Kalman filter). In another aspect, the determined vehicle pose can be utilized by other systems of the autonomous vehicle, such as a navigation system.

In one aspect, the process 700 further includes a sixth step 712 where the lane marker mapper 506*b* compares the prior map to the multiple projections of the lidar point cloud centered at the perturbed final vehicle poses. According to the comparison, the lane marker mapper 506*b* returns the best match among the perturbed final vehicle poses and the estimated covariance of the translation of the vehicle.

Each of the aforementioned systems or process described above in connection with FIGS. 5-7 can represent a software application, module, and/or algorithm that can be embodied as compiled computer instructions that are executable by a computer, such as an onboard computer of an autonomous vehicle. For example, modules illustrated in FIG. 5 and/or the steps illustrated in FIGS. 6-7 can be embodied as instructions stored in a memory (e.g., the memory 508) that, when executed by a processor (e.g., the processor 510), cause the computer system to perform the delineated steps. Although described generally in terms of software, in other aspects, the aforementioned applications, modules, and/or algorithms can be implemented in hardware (e.g., application-specific integrated circuits and field-programmable gate arrays) or combinations of hardware and software.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

The software for the various computer systems (e.g., the aerial imaging system 100 illustrated in FIG. 1 and the localization system for an autonomous vehicle illustrated in FIG. 5) described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as a "step" of a process, "processing," "computing," "calculating," "determining," or the like, refer to the action and processes of a computer system, or similar electronic computing device, that manipulates and transforms data represented as electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

Further, as used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

In addition, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). Similarly, the term "based on" should not be interpreted as "based only on" even though the term "based at least partially on" may be used at times.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

The subject matter of the present disclosure is described with specificity herein to meet statutory requirements. However, as indicated above, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
providing aerially captured images of a geographical area to a machine learning model trained to recognize features of objects depicted in the images;
obtaining, using the machine learning model, feature matrices that respectively indicate the features;
determining three-dimensional geometric representations of the features based at least on the feature matrices as obtained using the machine learning model, the three-dimensional geometric representations including one or more of: one or more points, one or more polylines, or one or more polygons that represent the features;
annotating the images with the three-dimensional geometric representations;
generating map data corresponding to the geographical area based at least on the images as annotated; and
providing the map data to a vehicle such that the map data is used by the vehicle in performance of one or more driving operations.

2. The method of claim 1, wherein the three-dimensional geometric representations include global positioning coordinates corresponding to the features.

3. The method of claim 1, further comprising updating one or more parameters of the machine learning model using a previously annotated image, wherein training the machine learning model includes:
projecting an annotation of the previously annotated image onto a camera plane corresponding to a camera used to capture the previously annotated image;
obtaining, using the annotation as projected, a two-dimensional projection of a particular three-dimensional geometric representation of a feature that is included in the annotation;
transforming the two-dimensional projection into a particular feature matrix; and
training the machine learning model using the particular feature matrix.

4. The method of claim 3, wherein the projecting the annotation onto the camera plane is based at least on a pose of the camera at a time that the camera was used to capture the previously annotated image.

5. The method of claim 1, wherein the map data includes at least one of: lane graph map data or localization prior map data.

6. The method of claim 1, wherein the generating the map data includes:
defining geometries of one or more lane segments from the three-dimensional geometric representations of the features; and connecting the one or more lane segments according to their geometries to define one or more traffic lanes.

7. The method of claim 6, further comprising:
defining geometries of one or more traffic lights from the three-dimensional geometric representations of the features; and
assigning the one or more traffic lights to the one or more traffic lanes.

8. The method of claim 1, further comprising stitching two or more images of the images together based at least on one or more poses of one or more respective cameras used to capture the images, wherein the generating the map data is performed based at least on the stitched together images.

9. The method of claim 1, wherein the generating the map data includes:
discretizing the three-dimensional geometric representations of the features into aligned point clouds;
assigning a normalized vector to each point of the aligned point clouds, the normalized vector indicating a direction of a polyline from which the point was discretized; and
indexing the aligned point clouds and the normalized vectors into an encoded form that allows for use in navigation within the geographical area.

10. A system comprising:
one or more processors to perform operations, the operations comprising:
obtaining, using a machine learning model, feature classifications that correspond to features of objects depicted in images of a geographical area in which the images are provided to the machine learning model, one or more of the feature classifications being based at least on one or more epipolar geometrical relations corresponding to two or more of the images;
annotating the images with three-dimensional geometric representations that are based at least on the feature classifications as obtained; and
generating map data corresponding to the geographical area based at least on the images as annotated.

11. The system of claim 10, wherein the three-dimensional geometric representations include one or more of: one or more points, one or more polylines, or one or more polygons that represent the features.

12. The system of claim 10, wherein the feature classifications include feature matrices that indicate the features.

13. The system of claim 10, the operations further comprising updating one or more parameters of the machine learning model using a previously annotated image, wherein training the machine learning model includes:
projecting an annotation of the previously annotated image onto a camera plane corresponding to a camera used to capture the previously annotated image;
obtaining, using the annotation as projected, a two-dimensional projection of a particular three-dimensional geometric representation of a feature that is included in the annotation; and
training the machine learning model based at least on the two-dimensional projection.

14. The system of claim 10, wherein the map data includes at least one of: lane graph map data or localization prior map data.

15. The system of claim 10, wherein the generating the map data includes:
defining geometries of one or more lane segments from the three-dimensional geometric representations of the features;
connecting the one or more lane segments according to their geometries to define one or more traffic lanes;
defining geometries of one or more traffic lights from the three-dimensional geometric representations of the features; and
assigning the one or more traffic lights to the one or more traffic lanes.

16. The system of claim 10, the operations further comprising stitching two or more images of the images together based at least on one or more poses of one or more respective cameras used to capture the images, wherein the generating the map data is based at least on the stitched together images.

17. The system of claim 10, wherein the generating the map data includes:
discretizing the three-dimensional geometric representations of the features into aligned point clouds;
assigning a normalized vector to each point of the aligned point clouds, the normalized vector indicating a direction of a polyline from which the point was discretized; and
indexing the aligned point clouds and the normalized vectors into an encoded form that allows for use in navigation within the geographical area.

18. The system of claim 10, wherein the images include aerially captured images.

19. A system comprising:
one or more processors to perform operations comprising:
obtaining, using a machine learning model, feature classifications that correspond to features of objects depicted in images of a geographical area in which the images are provided to the machine learning model;
annotating the images with three-dimensional geometric representations that are based at least on the feature classifications as obtained, the three-dimensional geometric representations including one or more of: one or more points, one or more polylines, or one or more polygons that represent the features;
generating nna p data corresponding to the geographical area based at least on the images as annotated; and
providing the map data to a vehicle such that the map data is used by the vehicle in performance of one or more driving operations.

20. The system of claim 19, wherein one or more of the feature classifications is based at least on one or more epipolar geometrical relations corresponding to two or more of the images.

* * * * *